3,122,560
N-HYDROXYDICARBOXIMIDES
Raymond H. Rigterink, Midland, Mich., assignor to The Dow Chemical Company, Midland, Mich., a corporation of Delaware
No Drawing. Filed June 20, 1962, Ser. No. 203,699
3 Claims. (Cl. 260—326)

The present invention is directed to the N-hydroxydicarboximides corresponding to the formula

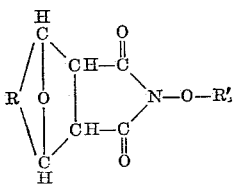

In this and succeeding formulae in the present specification and claims, R represents ethylene or vinylene and R' represents hydrogen or an alkali metal. As it is used in the present specification and claims, the term alkali metal is inclusive of sodium, potassium, and lithium.

Those compounds of the present invention wherein R' represents hydrogen can be prepared by causing a reaction between hydroxylamine and a dicarboxylic anhydride having the formula

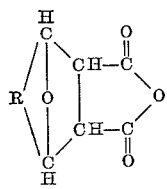

The preparation is advantageously carried out in an inert liquid reaction medium, such as methanol, water, or acetone. The reaction is slightly exothermic and while it goes forward at temperatures of from 0° C. to 100° C., room temperature of about 20° to 25° C. is preferred for the reaction. The reaction to prepare the present N-hydroxydicarboximides consumes the hydroxylamine starting material and the dicarboxylic anhydride starting material in equimolecular proportions. The reacting substances can be employed in any proportions but the use of proportions near to or exactly those consumed in the reaction is preferred. Upon completion of the reaction, the desired product is separated in manners which, in view of the instant specification, will be obvious to skilled chemists for the separation of organic products from reaction mixtures wherein they are prepared. For example, the product can be separated by fractional crystallization, solvent extraction, and the like.

In carrying out the reaction, the dicarboxylic anhydride is contacted with the hydroxylamine, as, for example, by adding one reactant to the other reactant. Sometimes it is convenient to employ the hydrochloride salt of the hydroxylamine in which case the free hydroxylamine base is released to react by, for example, adding an alkoxide of an alkali metal. Upon the contacting of the reactants, some of the desired product is prepared almost immediately; where optimum yields are desired, it is often convenient that the reaction mixture be allowed to stand several hours or longer upon completion of the contacting of the reactants to insure substantial completion of reaction. Upon completion of the reaction, the reaction medium can be removed from the reaction mixture by evaporation or distillation to obtain the desired product as a residue. This product can be purified by, for example, washing with water or suitable organic liquid and recrystallization.

When it is desired to obtain the alkali metal derivatives of the N-hydroxydicarboximides, that is, those compounds of the present invention wherein R' represents alkali metal, it is convenient to prepare the N-hydroxydicarboximide compound as parent substance and thereafter cause it to react with an alkali metal or an alkaline compound of an alkali metal such as the hydroxide, carbonate, bicarbonate and the like.

The following example will, without more, enable the skilled chemist to practice the invention

EXAMPLE

N-Hydroxy-7-Oxabicyclo(2.2.1)Hept-5-Ene-2,3-Dicarboximide

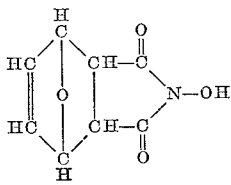

A reaction mixture is prepared as follows: sodium methylate (34.4 grams; 0.63 mole) and hydroxylamine hydrochloride (44.3 grams; 0.63 mole) are added to 800 milliliters of methanol at room temperature. To the resulting solution is thereafter added rapidly with stirring 106 grams (0.63 mole) of 7-oxabicyclo-(2.2.1)-hept-5-ene-2,3-dicarboxylic anhydride.

The reaction mixture is then permitted to remain at room temperature with stirring for a period of about twenty hours. Thereafter the resulting mixture is filtered, and the filtrate subjected to fractional distillation under subatmospheric pressure to separate the N-hydroxy-7-oxabicyclo(2.2.1)hept-5-ene-2,3-dicarboximide product as a residue. The product is taken up in chloroform at room temperature, crystallized therefrom at a temperature near to 0° C., and the recrystallized product air-dried for a period of about 16 hours. Subsequently the dried product is taken up in boiling 1,2-dichloropropane, crystallized therefrom with chilling, and the recrystallized product dried at a temperature of about 60° C. and found to be a white crystalline material melting at from 167° to 170° C. with decomposition.

In a similar manner, N-hydroxy-7-oxabicyclo(2.2.1)heptane-2,3-dicarboximide (melting at from 195° to 197° C. with decomposition) is prepared by reacting together hydroxylamine and 7-oxabicyclo(2.2.1)heptane-2,3-dicarboxylic anhydride.

From these parent N-hydroxydicarboximides are prepared the alkali metal derivatives thereof. In a representative operation, 90.6 grams (0.5 mole) of N-hydroxy-7-oxabicyclo(2.2.1)hept-5-ene-2,3-dicarboximide are dispersed in water and lithium bicarbonate (34.0 grams; 0.5 mole) added thereto. The resulting mixture is heated for a period of time until evolution of gas ceases, whereupon the resulting lithium salt of the N-hydroxy-7-oxabicyclo(2.2.1)hept-5-ene-2,3-dicarboximide is prepared.

Carbon dioxide and water are by-products. The desired lithium salt is readily separated by evaporation of the aqueous reaction medium.

In a similar manner, the sodium salt of N-hydroxy-7-oxabicyclo(2.2.1)heptane - 2,3-dicarboximide (molecular weight of 183.2) is prepared by reacting together sodium hydroxide and N-hydroxy-7-oxabicyclo(2.2.1)heptane-2,3-dicarboximide.

The present compounds are useful as rodenticides and for the control of undesirable vegetation. For such use, the unmodified compounds can be employed. However, the present invention also encompasses the use of the compounds together with a herbicide adjuvant. In such use, the compounds can be dispersed upon a finely divided solid and the resulting preparations employed as dusts. Also, such mixtures can be dispersed in water with the aid of a wetting agent and the resulting aqueous suspensions employed as sprays. In other procedures, the products can be employed as constituents of organic liquid compositions, oil-in-water or water-in-oil emulsions, or water dispersions with or without the addition of wetting, dispersing, or emulsifying agents.

In a representative operation, the soil surface application of a liquid dispersion of N-hydroxy-7-oxabicyclo(2.2.1)heptane-2,3-dicarboximide at the rate of 20 pounds of compound per acre to soil heavily planted with seeds of German Millet results in a virtually complete kill of the seeds and germinant seedings of the grass, whereas a similar area, treated identically except that the present compound is not employed produces a dense stand of grass which grows normally.

I claim:
1. The compounds of the formula

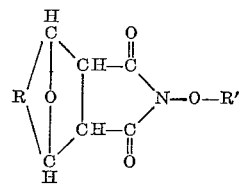

wherein R represents a member selected from the group consisting of ethylene and vinylene and R' represents a member selected from the group consisting of hydrogen and the alkali metals.

2. N - hydroxy-7-oxabicyclo(2.2.1)hept-5-ene-2,3-dicarboximide.

3. N - hydroxy-7-oxabicyclo(2.2.1)heptane-2,3-dicarboximide.

References Cited in the file of this patent
UNITED STATES PATENTS
2,524,145    Tawney _____ Oct. 3, 1950

FOREIGN PATENTS
336,397    Switzerland _____ Apr. 15, 1959

OTHER REFERENCES
Rice et al.: J. Am. Chem. Soc., volume 75, pages 4911–15 (1953).
Beilstein: Handbuch der organischen Chemie, volume 27, second work, pages 297–298 (1955).